Aug. 28, 1956 J. DOLZA 2,760,347
SELF-CONTAINING AIR CONDITIONING UNIT IN AN AUTOMOBILE
Filed March 23, 1954
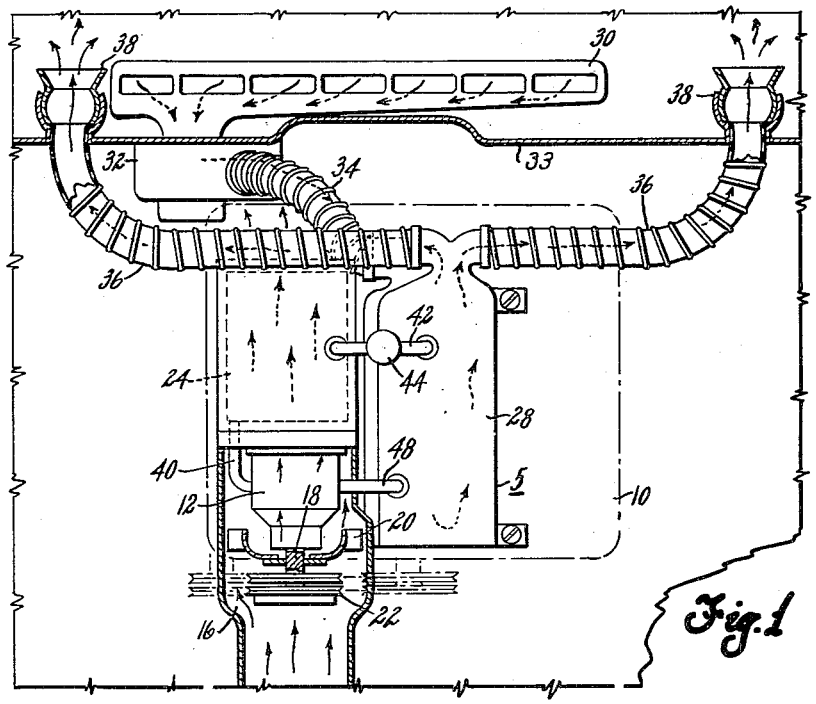
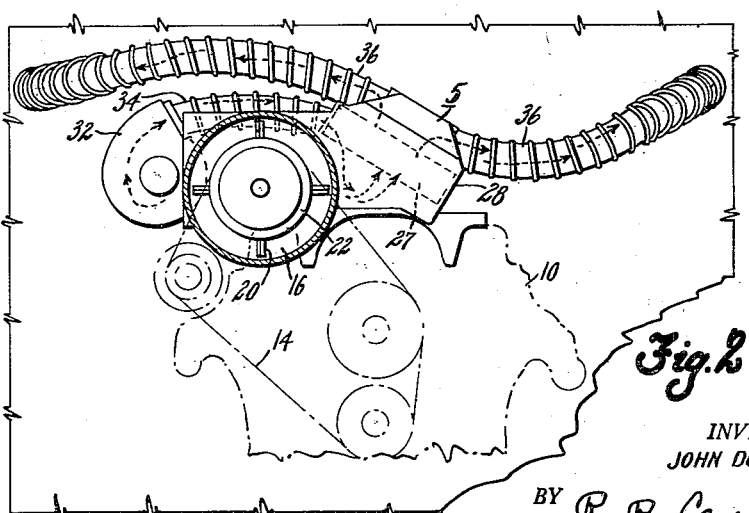
INVENTOR.
JOHN DOLZA
BY R. R. Candor
HIS ATTORNEY United States Patent Office 2,760,347
Patented Aug. 28, 1956

2,760,347

SELF-CONTAINING AIR CONDITIONING UNIT IN AN AUTOMOBILE

John Dolza, Davisburg, Mich., assignor to General Motors Corporation, Detroit, Mich., a corporation of Delaware Application March 23, 1954, Serial No. 418,074

8 Claims. (Cl. 62—117.1)

This invention relates to refrigerating apparatus and more particularly to an automobile air conditioning system.

A large number of patents have been granted from time to time on various automobile air conditioning systems in which the compressor is mounted in the engine compartment and the evaporator is mounted at some remote place but such systems necessitate long refrigerant lines which must be connected when the system is installed on the car and necessitate special insulation.

It is an object of this invention to provide an air conditioning system for an automobile in which the entire refrigeration system is incorporated in a package which may be installed and removed as a unit which has been fully charged with the required amount of refrigerant and lubricant at the factory which makes the refrigeration equipment.

Another object of this invention is to provide an air conditioning unit which may be installed in a car like any other accessory when the car is purchased or subsequent to the original delivery of the car.

Still another object of this invention is to provide a lightweight, compact unit which may be installed by an ordinary garage mechanic, without making any major changes in the construction of the car.

Further objects and advantages of the present invention will be apparent from the following description, reference being had to the accompanying drawings, wherein a preferred form of the present invention is clearly shown.

In the drawings:

Figure 1 is a plan view with parts broken away and somewhat schematic showing the arrangement of the air conditioning equipment relative to the engine and the dashboard of an automobile; and, Figure 2 is an elevational end view of the air conditioning apparatus shown in Figure 1 with parts broken away.

Referring now to the drawing wherein a preferred embodiment of the invention has been shown, reference numeral 5 generally designates an air conditioning assembly and reference numeral 10 designates the main engine of an automobile. The engine 10 is used for driving a refrigerant compressor 12 through a conventional belt drive 14. The compressor 12 and a condenser 24 are mounted in a longitudinally extending chamber 16 which forms an air duct having a front air inlet disposed to receive air from the front end of the car. The compressor 12 is provided with a drive shaft 18 which has secured thereto an air circulating fan 20 which is used to forcefully circulate condenser cooling air through the duct 16 when the car is standing still or moving slowly.

The belt drive including a two-speed clutch and pulley arrangement 22 which may be of the general type disclosed in detail in copending application Serial No. 373,853, filed August 12, 1953, whereby the compressor 12 and the fan 20 are operated at a fairly high speed even though the engine 10 is idling. The refrigerant condenser 24 is provided in the duct 16 directly to the rear of the compressor 12. An evaporator 27 is provided in a chamber 28 as shown. The air intake and distributing ducts may be arranged so that either fresh air, recirculated air or a mixture of both may be circulated in thermal exchange relationship with the evaporator 27. For purposes of illustration there is shown an arrangement in which fresh air is introduced through a fresh air intake grill 30 which is of the type mounted directly adjacent the bottom front edge of the windshield and arranged to receive fresh air from outside the passenger compartment. The fresh air is directed into the intake of an air circulating fan 32 which is secured to the front side of the dashboard 33. The outlet of the fan connects to a duct 34 which leads to the inlet side of the evaporator chamber 28. As best shown in Figure 2 of the drawing, the air enters the evaporator chamber 28 beneath the evaporator 27 and is caused to flow upwardly through the evaporator and is then discharged through a pair of flexible outlet ducts 36 which lead to air distributing grills 38 mounted on the dashboard at the front end of the passenger compartment so as to discharge the conditioned air rearwardly into the passenger compartment.

The refrigerant circuit is of conventional construction wherein the compressed gas is adapted to flow from the outlet of the compressor through a line 40 which leads to the condenser 24. The condensed refrigerant is supplied to the evaporator through the line 42 in which there is provided a pressure regulating device 44. This pressure regulating device is preferably a thermostatic expansion valve although any other type of regulating device could be used such as a fixed restrictor or an automatic expansion valve. The vaporized refrigerant leaves the evaporator through the usual suction line 48 which returns the refrigerant vapor to the compressor 18.

By virtue of the above described construction it will be noted that a common housing generally designated by the reference numeral 5 serves to support the evaporator, compressor, and condenser directly above or slightly towards one side of the main car engine 10. The duct or chamber 16 contains the refrigerant liquefying apparatus which lies in close proximity to the evaporator so as to eliminate the need for long refrigerant lines and so as to make it possible to mount the entire refrigerant system in a single housing which may be quickly installed or removed as a unit. The air ducts 34 and 36 are the flexible type and may readily be installed or removed with a minimum amount of inconvenience and expense and all of the refrigerant connections may be made at the factory which makes the refrigerant equipment.

While the form of embodiment of the invention as herein disclosed constitutes a preferred form, it is to be understood that other forms might be adopted, as may come within the scope of the claims which follow.

What is claimed is as follows:

1. A self-contained air conditioning unit for mounting in a passenger automobile having an engine in an engine compartment and having a passenger compartment separated from the engine compartment by means of a dashboard, housing means adapted to be supported in said engine compartment, said housing means having a longitudinally extending chamber having an air intake opening at its front end for receiving outside air, a compressor disposed within said chamber and adapted to be driven by the main car engine, a condenser in said chamber, said compressor having an operating shaft, fan means secured to said shaft for forcefully circulating air through said chamber, said housing means having an evaporator chamber formed therein, an evaporator within said chamber, refrigerant flow connections between said evaporator, compressor and condenser, means for introducing air to be conditioned into said evaporator chamber adjacent one side of said evaporator, and means for conducting air leaving said evaporator chamber into the passenger compartment of said automobile.

2. A self-contained air conditioning unit for mounting in a passenger automobile having an engine in an engine compartment and having a passenger compartment separated from the engine compartment by means of a dashboard, housing means adapted to be supported in said engine compartment, said housing means having a longitudinally extending chamber having an air intake opening at its front end for receiving outside air, a compressor disposed within said chamber and adapted to be driven by the main car engine, a condenser in said chamber, said compressor having an operating shaft, fan means secured to said shaft for forcefully circulating air through said chamber, said housing means having an evaporator chamber formed therein, an evaporator withing said chamber, refrigerant flow connections between said evaporator, compressor and condenser, means for introducing air to be conditioned into said evaporator chamber adjacent one side of said evaporator, and means for conducting air leaving said evaporator chamber into the passenger compartment of said automobile, said last named means comprising a pair of flexible ducts extending from the outlet of said evaporator chamber to apertures in said dashboard adjacent opposite sides of said passenger compartment.

3. A self-contained air conditioning unit for mounting in the engine compartment of a passenger automobile, housing means, means for supporting said housing means in said engine compartment, said housing means having a longitudinally extending chamber having an air intake opening arranged to receive outside air, a compressor disposed within said chamber and adapted to be driven by said engine, a condenser in said chamber, fan means for forcefully circulating air through said chamber, said housing means having an evaporator compartment formed therein, an evaporator within said evaporator compartment, refrigerant flow connections between said evaporator, compressor and condenser, means including a fan for introducing air to be conditioned into said evaporator compartment, and means for conducting air leaving said evaporator compartment into the passenger compartment of said automobile, said last named means comprising a pair of flexible ducts extending from the outlet of said evaporator chamber to said passenger compartment.

4. In combination with an automobile having a passenger compartment and an engine compartment separated therefrom by means of a panel; said engine compartment having an engine therein for driving said automobile; a self-contained package type air conditioning unit including main housing means having a condenser chamber and an evaporator chamber located side by side; means for supporting said housing means in said engine compartment; said unit including a refrigerant compressor, a condenser, and an evaporator connected in refrigerant flow relationship; said evaporator being mounted in said evaporator chamber; said evaporator chamber having an air inlet for introducing air to be conditioned into thermal exchange with said evaporator and having an air outlet through which the conditioned air discharges into said passenger compartment; said condenser chamber having an inlet opening adjacent its front end for the introduction of condenser cooling air; said condenser being mounted in said condenser chamber; said compressor having a drive shaft; and torque transmitting means between said engine and said drive shaft.

5. In combination with an automobile having a passenger compartment and an engine compartment separated therefrom by means of a panel; said engine compartment having an engine therein for driving said automobile; a self-contained package type air conditioning unit including main housing means having a condenser chamber and an evaporator chamber located side by side; means for supporting said housing means in said engine compartment; said unit including a refrigerant compressor, a condenser, and an evaporator connected in refrigerant flow relationship; said evaporator being mounted in said evaporator chamber; said evaporator chamber having an air inlet for introducing air to be conditioned into thermal exchange with said evaporator and having an air outlet through which the conditioned air discharges into said passenger compartment; said condenser chamber having an inlet opening adjacent its front end for the introduction of condenser cooling air; said condenser being mounted in said condenser chamber; said compressor having a drive shaft; torque transmitting means between said engine and said drive shaft; a blower mounted on said panel having an air outlet connected to said evaporator chamber air inlet by means of a flexible duct; and flexible duct means for connecting the outlet of said evaporator chamber to said passenger compartment.

6. In combination with an automobile having a passenger compartment and an engine compartment separated from one another by means of a dashboard, said engine compartment having an engine therein for driving said automobile, a self-contained package type air conditioning unit including housing means having a refrigerant liquefying chamber and an evaporator chamber arranged side by side, means for supporting said housing means in said engine compartment, said unit including a refrigerant compressor, a condenser and an evaporator connected in refrigerant flow relationship, said refrigerant liquefying chamber having an inlet opening adjacent its front end for the introduction of condenser cooling air, said compressor and said condenser being mounted in said refrigerant liquefying chamber, said compressor having a drive shaft, torque transmitting means between said engine and said drive shaft, an air circulating fan mounted on said compressor drive shaft, and flexible duct means for conveying the air to be conditioned for said passenger compartment to and from said evaporator chamber.

7. In combination with an automobile having a passenger compartment and an engine compartment separated from one another by means of a dashboard, said engine compartment having an engine therein for driving said automobile, a self-contained package type air conditioning unit including housing means having a refrigerant liquefying chamber and an evaporator chamber arranged side by side, means for supporting said housing means in said engine compartment, said unit including a refrigerant compressor, a condenser and an evaporator connected in refrigerant flow relationship, said refrigerant liquefying chamber having an inlet opening adjacent its front end for the introduction of condenser cooling air, said compressor and said condenser being mounted in said refrigerant liquefying chamber, said compressor having a drive shaft, torque transmitting means between said engine and said drive shaft, an air circulating fan mounted on said compressor drive shaft, and flexible duct means for conveying the air to be conditioned for said passenger compartment to and from said evaporator chamber, said flexible duct means for conveying air from said evaporator chamber comprising a pair of ducts which enter said passenger compartment through said dashboard at spaced points.

8. In a self-contained air conditioning apparatus for use in an automobile having a passenger compartment and an engine compartment separated therefrom by means of a panel; the combination; main housing means having a condenser chamber and an evaporator chamber located side by side; means for supporting said housing means in said engine compartment; said unit including a refrigerant compressor, a condenser, and an evaporator connected in refrigerant flow relationship; said evaporator being mounted in said evaporator chamber; said evaporator chamber having an air inlet for introducing air to be conditioned into thermal exchange with said evaporator and having an air outlet through which the conditioned air discharges into said passenger compartment; said condenser chamber having a fresh air inlet opening for the introduction of condenser cooling air; said condenser being mounted in said condenser chamber; said compressor having a drive shaft; and torque transmitting means between said engine and said drive shaft.

References Cited in the file of this patent

UNITED STATES PATENTS

| | | |
|---|---|---|
| 2,053,206 | Sargent | Sept. 1, 1936 |
| 2,091,594 | Innes | Aug. 31, 1937 |
| 2,336,089 | Gould | Dec. 7, 1943 |
| 2,361,855 | McCormack | Oct. 31, 1944 |
| 2,561,876 | Leonard | July 24, 1951 |
| 2,620,636 | Stanton | Dec. 9, 1952 |
| 2,718,763 | Burgess | Sept. 27, 1955 |